United States Patent
Son et al.

(10) Patent No.: US 6,507,554 B2
(45) Date of Patent: *Jan. 14, 2003

(54) ACTUATOR FOR OPTICAL PICK-UP AND METHOD OF ROLLING DRIVING COIL THEREFOR

(75) Inventors: Yong-ki Son, Suwon (KR); Byung-ryul Ryoo, Suwon (KR); Yong-hoon Lee, Suwon (KR); Seok-jung Kim, Suwon (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 73 days.

(21) Appl. No.: 09/301,464

(22) Filed: Apr. 29, 1999

(65) Prior Publication Data

US 2001/0040858 A1 Nov. 15, 2001

(30) Foreign Application Priority Data

Aug. 13, 1998 (KR) .............................................. 98-32889

(51) Int. Cl.$^7$ ................................................ G11B 17/00
(52) U.S. Cl. ...................................................... 369/244
(58) Field of Search ................................ 369/244, 251, 369/44.14, 44.15, 44.22; 359/819, 823, 824

(56) References Cited

U.S. PATENT DOCUMENTS

| 5,617,256 A | * | 4/1997 | Mitsumori et al. | ......... 369/244 |
|---|---|---|---|---|
| 5,844,881 A | * | 12/1998 | Kasuga et al. | ............... 369/244 |
| 5,870,373 A | * | 2/1999 | Choi et al. | ................... 369/244 |
| 5,933,405 A | * | 8/1999 | Song | ........................... 369/244 |
| 6,031,812 A | * | 2/2000 | Liou | ........................... 369/244 |

FOREIGN PATENT DOCUMENTS

| JP | 5-109099 | * | 4/1993 | ................. 369/244 |
|---|---|---|---|---|
| JP | 9-134533 | | 5/1997 | |
| JP | 11-283262 | | 10/1999 | |
| KR | 1993-4022 | | 6/1993 | |

* cited by examiner

*Primary Examiner*—Allen Cao
(74) *Attorney, Agent, or Firm*—Staas & Halsey LLP

(57) ABSTRACT

An actuator for an optical pick-up and a method of rolling a driving coil using the same. The actuator for the optical pick-up includes a bobbin for holding an object lens, a suspension for connecting the bobbin to a holder, and a magnetic driver. The magnetic driver includes a pair of permanent magnets respectively positioned near opposite sides of the bobbin, a plurality of tracking coils with pairs of the tracking coils rolled on opposite side surfaces of the bobbin, and a focus coil rolled around the bobbin and the plurality of tracking coils. The plurality of tracking coils and focus coil receive current to move the optical pickup through interaction with the permanent magnets, and a strong force is generated by narrowing a distance between the permanent magnets and the focus coil based upon the focus coil being rolled around the bobbin and the tracking coils. Accordingly, it is possible to improve the sensitivity and to prevent improper tilting of the actuator.

16 Claims, 6 Drawing Sheets

ACTUATOR FOR OPTICAL PICK-UP AND METHOD OF ROLLING DRIVING COIL THEREFOR

CROSS-REFERENCE TO RELATED APPLICATIONS

This application claims the benefit of Korean Application No. 98-32889, filed Aug. 13, 1998, in the Korean Patent Office, the disclosure of which is incorporated herein by reference.

BACKGROUND OF THE INVENTION

1. Field of the Invention

The present invention relates to an actuator for an optical pick-up, and more particularly, to an actuator for an optical pick-up which increases a sensitivity that is a value for displaying a frequency characteristic in the actuator and a method of rolling a driving coil thereof.

2. Description of the Related Art

In general, an optical pick-up for scanning a light beam on a surface of an optical disk through an object lens and detecting a light beam reflected from the disk is installed in an optical recording and reproducing apparatus such as an optical disk player.

The optical pick-up includes a semiconductor laser, an optical lens, and an optical diode for converting an optical signal of the reflected light beam into an electrical signal, and an actuator. The optical pick-up was first used in the audio field for devices such as a CD player and has become an essential part for products using an optical disk, such as an optical magnetic disk player and a video CD player.

Recently, the optical pick-up has become very small. Therefore, the optical pick-up is sometimes called an optical head. There are primarily two types of optical heads; a separated type in which a semiconductor laser, a beam splitter, and a photodetector are fixed and a portion on which an object lens actuator is loaded is driven; and an integrated type in which all parts including an object lens actuator and optical parts are loaded on one base and all parts are moved together.

In order to reproduce information of high quality using such an optical pick-up, the focus of the light beam on the optical disk should be accurately adjusted and the irradiated light beam should accurately follow a track formed on the optical disk.

In general, the operation of vertically moving the object lens to control the focal distance is called focusing. An operation of moving the object lens so that the light (optical) beam is accurately scanned along each track of the optical disk is called tracking.

Therefore, the optical pick-up includes an actuator for supporting the object lens and performing focusing and tracking operations.

Figure 1:
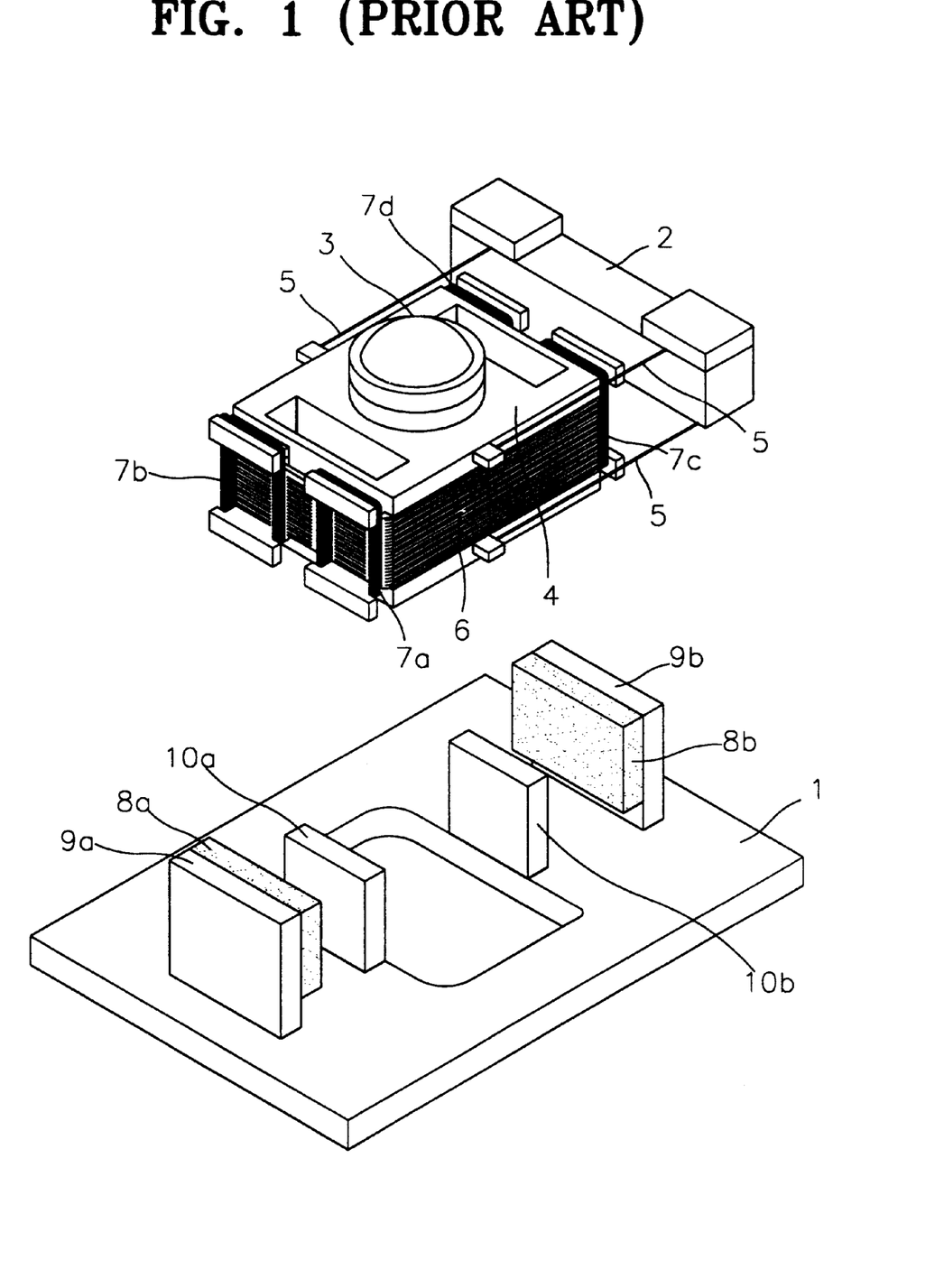
FIG. 1 is a perspective view of a conventional actuator for an optical pick-up.
Figure 2:
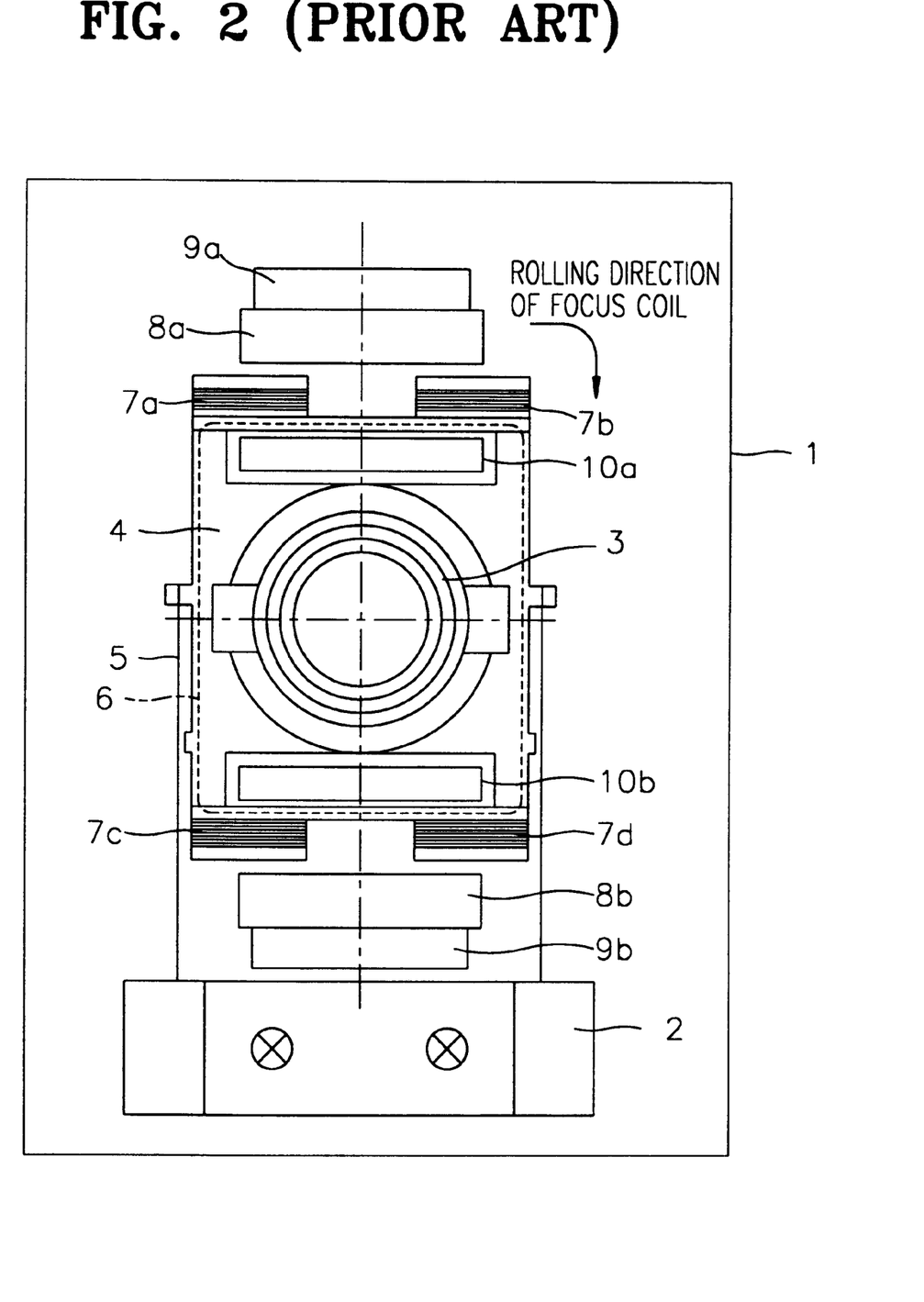
FIG. 2 is a plan view of the actuator shown in FIG. 1.
Figure 3:
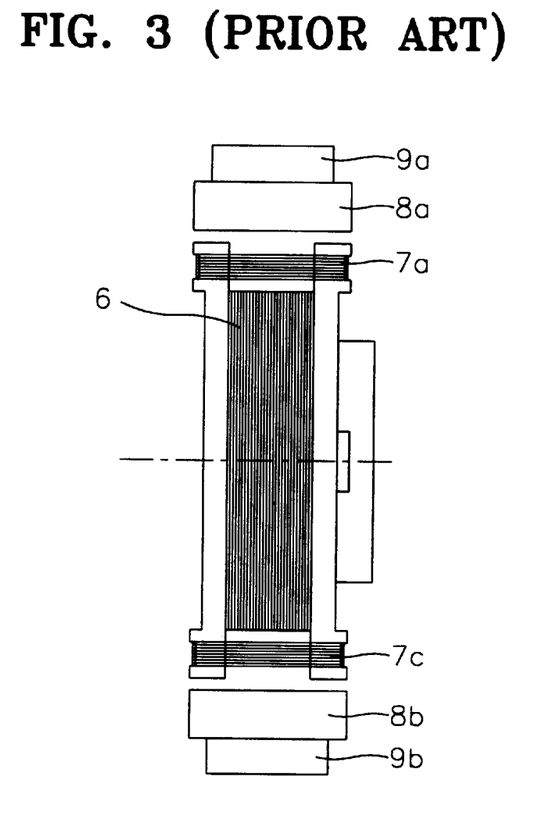
FIG. 3 is a left side view of the actuator shown in FIG. 1.
Figure 4:
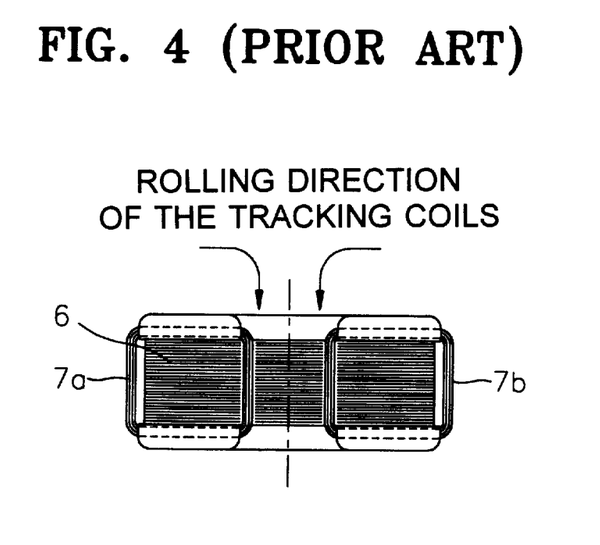
FIG. 4 is a front view of the actuator shown in FIG. 1.

FIG. 1 is a perspective view of a conventional actuator for an optical pick-up. FIG. 2 is a plan view of the conventional actuator for the optical pick-up shown in FIG. 1. FIG. 3 is a left side view of the conventional actuator for the optical pick-up shown in FIG. 1. FIG. 4 is a front view of the conventional actuator for the optical pick-up shown in FIG. 1.

The conventional actuator for the optical pick-up includes a base 1, a holder 2 fixed to the base 1, a bobbin 4 for holding an object lens 3, a suspension (wire springs) 5 for connecting the bobbin 4 to the holder 2, and magnetic driving means for moving the bobbin 4 in the direction of the track or the focus, as shown in FIGS. 1 and 2.

The magnetic driving means includes a focus coil 6 rolled around the bobbin 4, tracking coils 7a through 7d in which tracking coils 7a and 7b are rolled at opposite ends of a first side surface of the bobbin 4 and the tracking coils 7c and 7d are rolled at opposite ends of a second side surface of the bobbin 4 opposite the first side, at an outside portion of the focus coil 6, and a pair of permanent magnets 8a and 8b. Namely, as shown in FIGS. 3 and 4, a focus coil 6 and tracking coils 7a and 7c are separately rolled (in FIG. 4, tracking coils 7a and 7b are shown). Here, the tracking coils 7a and 7b are rolled at opposite ends of a first side surface of the bobbin 4 so as to face the permanent magnet 8a and the tracking coils 7c and 7d are rolled at opposite ends of a second side surface of the bobbin 4 so as to face the permanent magnet 8b. The tracking coils 7a through 7d are positioned at the outside portion of the focus coil 6. A pair of external yokes 9a and 9b installed on the base 1 are respectively attached to the permanent magnets 8a and 8b (see FIG. 1). A pair of internal yokes 10a and 10b fixed to the base 1 guide the bobbin 4 according to the magnetic flux.

In the actuator for the optical pick-up constructed as mentioned above, when current is applied to the focus coil 6 rolled around the bobbin 4 and the tracking coils 7a through 7d respectively rolled around the opposite sides of the bobbin 4, an electromagnetic force is generated by the current and the permanent magnets 8a and 8b according to Fleming's left hand rule. According to the direction to which the electromagnetic force operates, the bobbin 4 connected to the holder 2 installed in the base 1 by a suspension (wire springs) 5 is guided by the internal yokes 10a and 10b and is vertically or horizontally moved. Here, the force of the permanent magnets 8a and 8b is formed in the direction toward the ground. Accordingly, the object lens 3 loaded into the bobbin 4 performs the focusing and tracking operations.

According to a method of rolling a driving coil including the focus coil 6 and the tracking coils 7a through 7d by the conventional technology, the size of the permanent magnets should be large in order to improve the sensitivity by narrowing the distance between the focus coil and the permanent magnets.

Also, when the distance between each permanent magnet and the driving coil is wide, a portion in which the distribution of the magnetic flux is uniform becomes narrow. Accordingly, an imbalance of force is generated when the driving portion of the actuator is moved in the directions for tracking and focusing. Thus, the actuator is tilted, causing improper operation thereof.

SUMMARY OF THE INVENTION

To solve the above problem, it is an object of the present invention to provide an actuator for an optical pick-up, which is not improperly tilted when the driving portion of the actuator moves.

It is another object of the present invention to provide a method of rolling a driving coil in an actuator for an optical pick-up, to prevent improper tilting of the optical pick-up during tracking and focusing operations.

Accordingly, to achieve the above and other objects of the present invention, there is provided an actuator for an optical pick-up including a bobbin for holding an object lens, a suspension for connecting the bobbin to a holder, the actuator including a pair of permanent magnets respectively positioned near opposite sides of the bobbin, a plurality of tracking coils with pairs of the tracking coils rolled on opposite side surfaces of the bobbin and opposing the permanent magnets, a focus coil rolled around the bobbin and the plurality of tracking coils, wherein the plurality of tracking coils and focus coil receive current to move the optical pick-up through interaction with the permanent magnets. A strong force is generated by narrowing a distance between the permanent magnets and the focus coil based upon the focus coil being rolled around the bobbin and the tracking coils.

To further achieve the above and other objects of the present invention, there is provided a method of rolling a driving coil in an actuator for an optical pick-up including a bobbin for holding an object lens, the driving coil including a pair of permanent magnets, a plurality of tracking coils and a focus coil to move the bobbin in directions of tracking and focusing, the method including the steps of rolling the tracking coils with pairs of the tracking coils on opposite side surface of the bobbin, and rolling the focus coil around the bobbin and the plurality of tracking coils.

BRIEF DESCRIPTION OF THE DRAWINGS

The above objects and advantages of the present invention will become more apparent by describing in detail a preferred embodiment thereof with reference to the attached drawings, in which.

DESCRIPTION OF THE PREFERRED EMBODIMENT

Reference will now made in detail to the present preferred embodiment of the present invention, an example of which is illustrated in the accompanying drawings, wherein like reference numerals refer to the like elements throughout. The embodiment is described below in order to explain the present invention by referring to the figures.

Figure 5:
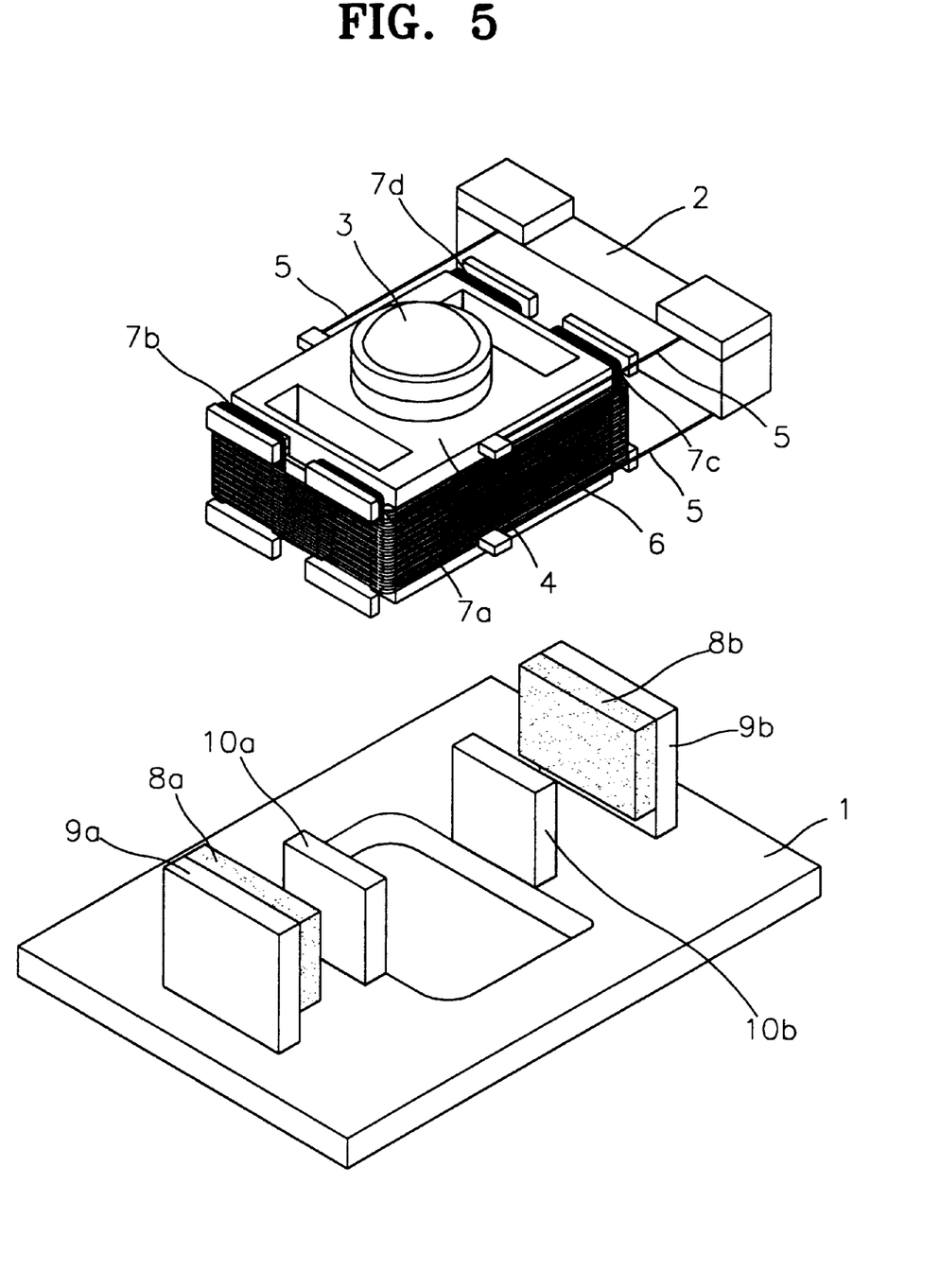
FIG. 5 is a perspective view of an actuator for an optical pick-up according to an embodiment of the present invention.
Figure 6:
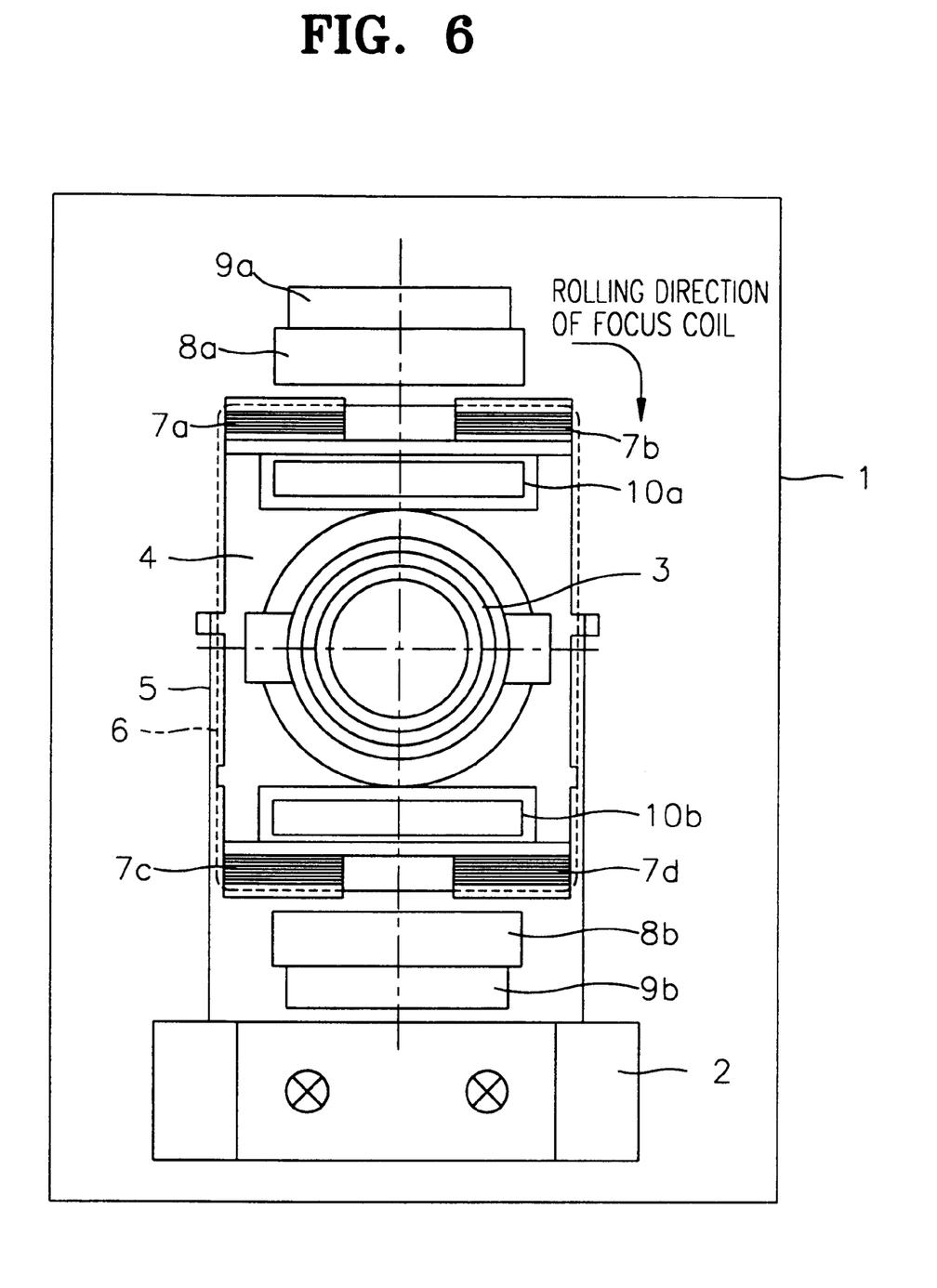
FIG. 6 is a plan view of the actuator shown in FIG. 5.

As shown in FIGS. 5 and 6, an actuator for an optical pick-up according to an embodiment of the present invention includes a base 1, a holder 2 fixed to the base 1, a bobbin 4 for holding an object lens 3, a suspension (wire springs) 5 formed by wire springs for connecting the bobbin 4 to the holder 2, and magnetic driving means for moving the bobbin 4 in the direction of a track or a focus.

The magnetic driving means includes tracking coils 7a through 7d in which tracking coils 7a and 7b are rolled at opposite ends of a first side surface of the bobbin 4 and the tracking coils 7c and 7d are rolled at opposite ends of a second side surface of the bobbin 4 opposite the first side surfaces, a focus coil 6 rolled around the bobbin 4 and the tracking coils 7a through 7d, and a pair of permanent magnets 8a and 8b formed on the base 1 at the opposite side surfaces of the bobbin 4. Here, the tracking coils 7a and 7b are rolled so as to face the permanent magnet 8a and the tracking coils 7c and 7d are rolled so as to face the permanent magnet 8b.

Figure 7:
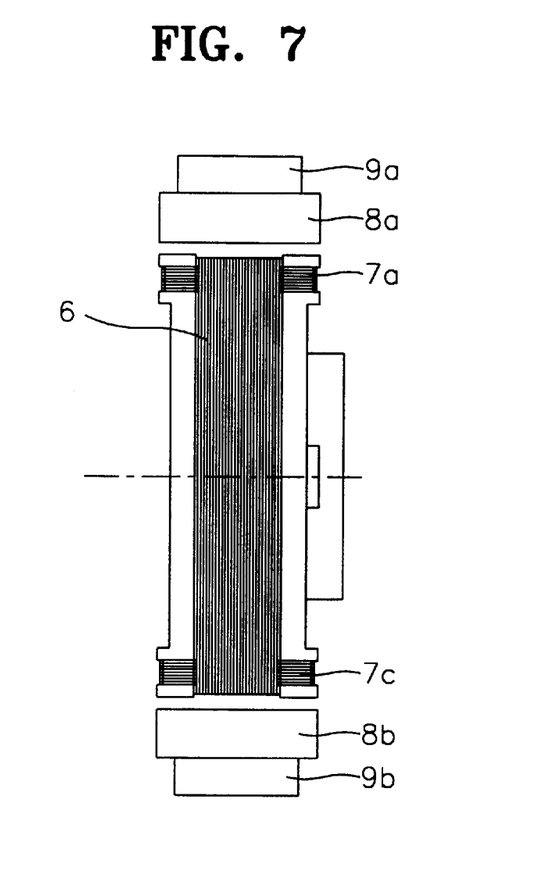
FIG. 7 is a left side view of the actuator shown in FIG. 5.
Figure 8:
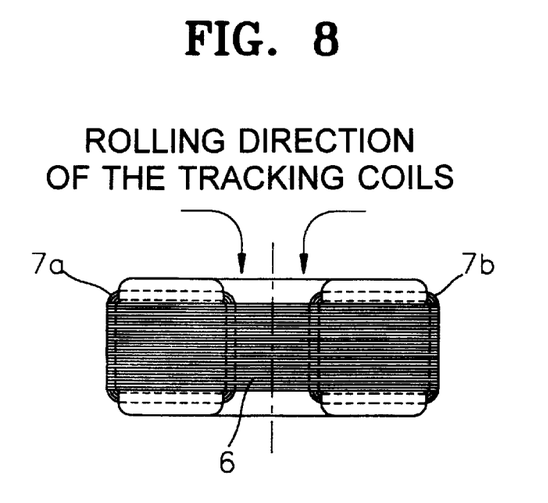
FIG. 8 is a front view of the actuator shown in FIG. 5.

As shown in FIGS. 7 and 8, in a method of rolling a driving coil according to the present invention, after rolling the tracking coils 7a and 7b at opposite ends of a first side surface of the bobbin 4 and rolling the tracking coils 7c and 7d at opposite ends of a second side surface of the bobbin 4, the focus coil 6 is rolled around both the bobbin 4 and the tracking coils 7a through 7d. Therefore, according to the embodiment of the present invention, it is possible to narrow the distance between the focus coil 6 and the permanent magnets 8a and 8b by rolling the focus coil 6 around both the bobbin 4 and the tracking coils 7a through 7d.

A pair of external yokes 9a and 9b installed in the base 1 are respectively attached to the permanent magnets 8a and 8b. A pair of internal yokes 10a and 10b formed on the base 1 guide the bobbin 4 by a magnetic flux formed when a current is passed through the tracking coils 7a through 7d and/or the focus coil 6. The internal yokes 10a and 10b pass through respective slots formed in the bobbin 4.

In the actuator for the optical pick-up constructed as mentioned above, when current is applied to the tracking coils 7a through 7d and the focus coil 6 surrounding the tracking coils 7a through 7d and rolled around the bobbin 4, an electromagnetic force is generated by the current and the permanent magnets 8a and 8b, according to Fleming's left-hand rule. The bobbin 4 connected to the holder 2 installed in the base 1 by the suspension (wire springs) 5 is guided by the internal yokes 10a and 10b according to the direction to which the electromagnetic force operates. Accordingly, the bobbin 4 moves vertically or horizontally. The magnetic force of the permanent magnets 8a and 8b is formed in a direction toward the ground. Therefore, the object lens 3 held by the bobbin 4 performs the focusing or tracking operation. The sensitivity used in the actuator of the optical pick-up of the present invention is a value for displaying the characteristic of a frequency in the actuator and shows a DC sensitivity, an AC sensitivity, and a natural oscillation, that is, the DC sensitivity shows a moving displacement of the bobbin 4 and the AC sensitivity shows an accelerating value for a focus direction according to applied current or voltage. Units of displaying a measured value with respect to the DC and AC sensibilities are used differently by companies.

According to the present invention, it is possible to increase the sensitivity without increasing the size of the permanent magnets and to remove the imbalance of force generated when the driving portion of the actuator moves in tracking and focusing directions since the driving coil is installed in a place where a portion in which the distribution of the magnetic flux is uniform is wide. Accordingly, it is possible to prevent the improper tilting of the actuator.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator for an optical pick-up including a bobbin for holding an object lens, and a suspension for connecting the bobbin to a holder, the actuator comprising:

a pair of permanent magnets respectively positioned near opposite sides of the bobbin;

a plurality of tracking coils, wherein pairs of the tracking coils are rolled on opposite side surfaces of the bobbin and oppose the permanent magnets; and a focus coil rolled around the bobbin and over the plurality of tracking coils;

wherein the plurality of tracking coils and the focusing coil receive a current to move the optical pick-up through interaction with the permanent magnets.

2. The actuator as claimed in claim 1, wherein the pairs of the tracking coils comprise:

a first pair of the tracking coils including
 a first tracking coil formed at an end of a first of the opposite side surfaces,
 a second tracking coil formed at another end of the first opposite side surface opposite to that of the first tracking coil; and a second pair of the tracking coils including
 a third tracking coil formed at an end of a second of the opposite side surfaces,
 a fourth tracking coil formed at another end of the second opposite side surface opposite to that of the third tracking coil.

3. The actuator as claimed in claim 1, further comprising:

a pair of external yokes respectively attached to sides of the permanent magnets facing away from the bobbin;

a pair of slots formed in the bobbin; and a pair of internal yokes respectively engaging the pair of slots to guide the bobbin, and positioned between the pair of permanent magnets.

4. The actuator as claimed in claim 2, further comprising:

a pair of external yokes respectively attached to sides of the permanent magnets facing away from the bobbin;

a pair of slots formed in the bobbin; and a pair of internal yokes respectively engaging the pair of slots to guide the bobbin, and positioned between the pair of permanent magnets.

5. The actuator as claimed in claim 1, wherein:

the suspension comprises suspension elements connecting the holder and the bobbin, to suspend the bobbin and enable movement thereof according to a force generated through the interaction of the first through fourth tracking coils, the focus coil and the pair of permanent magnets; and the actuator further comprises
 a base on which the pairs of external yokes, permanent magnets, and internal yokes are mounted.

6. The actuator as claimed in claim 2, further comprising:

suspension elements connecting the holder and the bobbin, to suspend the bobbin and enable movement thereof according to a force generated through the interaction of the plurality of tracking coils, the focus coil and the pair of permanent magnets; and a base on which the pairs of external yokes, permanent magnets, and internal yokes are mounted.

7. The actuator as claimed in claim 3, wherein:

the suspension comprises suspension elements connecting the holder and the bobbin, to suspend the bobbin and enable movement thereof according to a force generated through the interaction of the first through fourth tracking coils, the focus coil and the pair of permanent magnets; and the actuator further comprises
 a base on which the pairs of external yokes, permanent magnets, and internal yokes are mounted.

8. The actuator as claimed in claim 4, wherein:

the suspension comprises suspension elements connecting the holder and the bobbin, to suspend the bobbin and enable movement thereof according to a force generated through the interaction of the plurality of tracking coils, the focus coil and the pair of permanent magnets; and the actuator further comprises
 a base on which the pairs of external yokes, permanent magnets, and internal yokes are mounted.

9. The actuator as claimed in claim 1, wherein the actuator generates a strong force by narrowing a distance between the permanent magnets and the focus coil by the rolling of the focus coil around both the bobbin and the plurality of tracking coils.

10. An actuator for an optical pick-up including a bobbin for holding an object lens and suspension elements for connecting the bobbin to a holder, the actuator comprising:

a pair of permanent magnets respectively positioned near opposite sides of the bobbin;

at least one tracking coil formed on a first one of the opposite sides of the bobbin between the bobbin and a first one of the pair of permanent magnets, and at least another one tracking coil formed on a second one of the opposite sides of the bobbin between the bobbin and a second one of the pair of permanent magnets; and a focus coil wound around the bobbin and over the tracking coils;

wherein the tracking coils and the focus coil receive current to move the optical pick-up through interaction with the pair of permanent magnets.

11. The actuator as claimed in claim 10, wherein the tracking coils and focus coil are wound so that the tracking coils are perpendicular to the focus coil.

12. An actuator for an optical pick-up including a bobbin for holding an object lens and suspension elements for connecting the bobbin to a holder, the actuator comprising:

a pair of permanent magnets respectively positioned near opposite sides of the bobbin;

at least one tracking coil formed on a first one of the opposite sides of the bobbin between the bobbin and a first one of the pair of permanent magnets, and at least another one tracking coil formed on a second one of the opposite sides of the bobbin between the bobbin and a second one of the pair of permanent magnets; and a focus coil having a first portion closer to the first permanent magnet than the at least one tracking coil formed on the first opposite side, and a second portion closer to the second permanent magnet than the at least another one tracking coil formed on the second opposite side;

wherein the tracking coils and the focus coil receive current to move the optical pick-up through interaction with the pair of permanent magnets.

13. A method of rolling a driving coil in an actuator for an optical pick-up including a bobbin for holding an object lens, a pair of permanent magnets, a plurality of tracking coils and a focus coil, to move the bobbin in tracking and focusing directions, the method comprising:

rolling the tracking coils with pairs of the tracking coils on opposite side surfaces of the bobbin; and rolling the focus coil around the bobbin and over the plurality of tracking coils.

14. The method as claimed in claim 13, wherein:
the rolling of the tracking coils comprises winding each of the tracking coils to be substantially in a plane of the side surfaces of the bobbin on which each tracking coil is mounted; and
the rolling of the focus coil comprises winding the focus coil along each of four side surfaces of the bobbin including the opposite side surfaces.

15. A method of rolling a driving coil in an actuator for an optical pick-up including a bobbin for holding an object lens, [the driving coil including] a pair of permanent magnets, a plurality of tracking coils and a focus coil, to move the bobbin in tracking and focusing directions, the method comprising[ the steps of]:
rolling the tracking coils with at least one tracking coil on each of opposite side surfaces of the bobbin and facing a corresponding one of the pair of permanent magnets; and
rolling the focus coil so that portions of the focus coil are between each tracking coil and the corresponding permanent magnet.

16. An armature for an optical pickup actuator, comprising:
a bobbin having a first central axis and a periphery;
first and second tracking coils wound on the bobbin periphery and around second and third central axes, respectively, the first and second tracking coils oppositely disposed with respect to the first central axis, each of the second and third central axes disposed at an angle with respect to the first central axis; and
a focusing coil wound around the bobbin and over the tracking coils.

* * * * *

UNITED STATES PATENT AND TRADEMARK OFFICE
CERTIFICATE OF CORRECTION

PATENT NO.   : 6,507,554 B2
DATED        : January 14, 2003
INVENTOR(S)  : Yong-ki Son et al.

It is certified that error appears in the above-identified patent and that said Letters Patent is hereby corrected as shown below:

Column 7,
Line 12, delete "[the-driving coil including]".
Line 15, delete "[ the steps of]".

Signed and Sealed this

Twenty-fourth Day of June, 2003

JAMES E. ROGAN
*Director of the United States Patent and Trademark Office*